Sept. 15, 1970 SHOICHI NAGAE 3,528,816
FISH BAIT WITH A FISH-HOOK
Filed June 12, 1967

INVENTOR.
SHOICHI NAGAE
BY Jacob L. Hollin
ATTORNEY

3,528,816
FISH BAIT WITH A FISH-HOOK
Shoichi Nagae, 7 Yokohama-cho,
Matsue, Japan
Filed June 12, 1967, Ser. No. 645,171
Claims priority, application Japan, June 20, 1966,
41/39,997, 41/58,208
Int. Cl. A01k 85/00
U.S. Cl. 99—3                                 1 Claim

ABSTRACT OF THE DISCLOSURE

This invention discloses a fish bait put on a fish-hook and desiccated so that it can be preserved for a long period of time and also restored to near the living state, and a process for preparing the same.

---

In fishing, various kinds of baits are employed depending on the family and habitat of a fish, fishing season, and the like. Hence, anglers usually have had to purchase fish baits which would prove to be most effective under these various conditions, and put the bait on a fish-hook on the spot of fishing.

However, besides troubles in putting baits on a fish-hook, it required considerable skill to put small live baits, such as earthworms or lugworms, on the fish-hook, and moreover the live baits had to be torn off by hand, which gave rise to the unsanitary condition.

In view of these inconveniencies that hitherto existed in fishing, an object of the present invention is to provide a fish bait which is put on a fish-hook in advance and desiccated so that the trouble involved in putting a bait on the fish-hook can be saved and good sanitation may be maintained, and which at the same time can be preserved for a long period of time due to specific treatment described in detail hereinafter and restored to near the living state when in use.

It is another object of the present invention to provide a process for preparing a desiccated fish bait with a fish-hook.

In the accompanying drawings showing an embodiment of the present invention:

Figure 1:
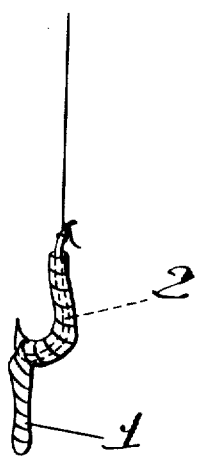
FIG. 1 shows a bait put on a fish-hook.
Figure 2:
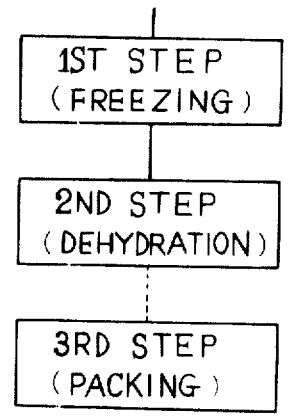
FIG. 2 is a flow sheet illustrating a process according to the present invention for preparing a desiccated fish bait with a fish-hook.

Referring to the drawings, a live bait 1 such as earthworm, lugworm, iwa-isome or Lumbriconereis, or the like, is hooked on a fish-hook 2, as shown in FIG. 1, and is desiccated according to the steps as illustrated in FIG. 2.

In a first step, the live bait 1 put on a fish-hook 2 is frozen so that its temperature is brought below about −25° C., and the water in the bait freezes as extremely small crystals within its cells. In a second step, said bait frozen with a fish-hook is kept for about 3 to 10 hours on a shelf in a vacuum desiccator having a degree of vacuum higher than 1,000µ Hg, preferably higher than 500µ Hg. In this step, water frozen in crystalline form in the cells of the bait is sublimed, and the latter is desiccated with its texture and appearance almost unaltered. The desiccated product may be stored in a bag made from laminated paper or the like, as the case may be.

In the second step, since the sublimation of frozen water contents in a bait absorbs heat from the bait and the temperature thereof will be excessively lowered, thus preventing the water contents from sublimating, it is necessary to keep the temperature of the bait at a moderate degree, by heating the shelf in the vacuum desiccator on which the baits are placed. The heating temperature of the shelf is lower than 60° C. so that the protein of the bait may not be subject to denaturation.

The desiccated bait obtained in the present invention has the texture like that of the living body, without any counter effects on the properties of the living body of the bait, e.g. its color, odor, taste, appearance, or the like.

When immersed in the sea water or river water while fishing, the desiccated bait is again restored to near its living state, since the water is sucked rapidly through the dehydrated cells formed on the desiccated organism.

Some examples of the present invention are as follows.

EXAMPLE I

A live earthworm was put on a fish-hook and frozen to −25° C. The bait thus frozen as it was put on the fish-hook was placed on a shelf in a vacuum desiccator, vacuum the degree of which was kept at about 1,000µ Hg, and desiccated for about 4 hours. The heating temperature of the shelf at the final stage of desiccation was about 50° C. The product thus obtained was preserved in the moisture-proof state and immersed in the water about 3 months later. It absorbed water in a few seconds and its appearance, color and odor were near those of the live earthworm prior to being put on a fish-hook and desiccated. The baits were given to gobies in a cistern along with live earthworms, and the biting was satisfactory.

EXAMPLE II

A live lugworm was put on a fish-hook and frozen rapidly to −30° C. The frozen lugworm as it was put on the fish-hook was placed on the heated shelf in a vacuum desiccator of about 500µ Hg for about 4.5 hours and dehydrated. The temperature of the shelf at the final stage of desiccation was about 55° C.

The product thus obtained was stored in the moisture-proof state and immersed in the water three months later. It absorbed water in several tens of seconds and its appearance, color and odor were very near those of the live lugworm prior to being put on the fish-hook and dehydrated. The desiccated products were given to river gibels together with the live lugworms, and the biting was very satisfactory.

EXAMPLE III

A live iwa-isome or Lumbriconereis was put on a fish-hook and frozen rapidly to about −40° C. The iwa-isome put on a fish-hook and frozen was placed on a heated shelf in a vacuum desiccator of about 400µ Hg and desiccated for about 10 hours. The shelf temperature at the final stage of drying was maintained at about 55° C.

The product thus obtained was stored in the moisture-proof state and immersed in the water about four months later. It absorbed water sufficiently in several tens of seconds, and its appearance, color and odor were near those of a live iwa-isome prior to being put on a fish-hook and desiccated. The bass in a fish-preserve bit this bait just as satisfactorily as it would have bit the live bait.

What is claimed is:

1. A process for preparing a dry bait from formerly live bait with a fish-hook which comprises putting a live bait on a fish-hook, freezing the live bait while on the fish-hook at a temperature between $-25°$ C. and $-40°$ C., whereby the water in the bait freezes as extremely small crystals within the bait's cells and desiccating on a shelf the bait thus frozen on the fish-hook under a degree of vacuum having the pressure between $400\mu$ Hg and about $1,000\mu$ Hg for about 3 to 10 hours, while maintaining the temperature of the shelf below $60°$ C.

References Cited

UNITED STATES PATENTS

| | | | |
|---|---|---|---|
| 2,555,088 | 5/1951 | Irwin | 43—41 |
| 3,361,566 | 1/1968 | Axelrod | 99—3 |

LIONEL M. SHAPIRO, Primary Examiner

J. R. HOFFMAN, Assistant Examiner

U.S. Cl. X.R.

43—42.53